United States Patent [19]

Gruenbaum et al.

[11] Patent Number: 5,817,805
[45] Date of Patent: Oct. 6, 1998

[54] SYNTHESIS OF BIS (PHTHALOCYANYLALUMINO) TETRAPHENYLDISILOXANES

[75] Inventors: William T. Gruenbaum, Rochester; Chang K. Kim; Cataldo A. Magguilli, both of Pittsford; Robert J. Opitz, Hilton, all of N.Y.

[73] Assignee: Eastman Kodak Company, Rochester, N.Y.

[21] Appl. No.: 804,197

[22] Filed: Feb. 21, 1997

[51] Int. Cl.$^6$ .......................... C07D 487/22; C09B 47/04
[52] U.S. Cl. .......................... 540/143; 540/122; 540/128; 540/139; 540/140
[58] Field of Search .................... 540/143, 122, 540/128, 139, 140

[56] References Cited

U.S. PATENT DOCUMENTS

| | | | |
|---|---|---|---|
| 2,242,301 | 5/1941 | Heilbron | 260/314 |
| 2,647,127 | 11/1953 | Brouillard | 260/314.5 |
| 2,673,854 | 3/1954 | Brouillard | 260/314.5 |
| 4,311,775 | 1/1982 | Regan | 430/37 |
| 5,456,998 | 10/1995 | Burt et al. | 430/58 |

OTHER PUBLICATIONS

J. Chem. Soc. 1936, pp. 1719–1736. Phthalocyanines. Part VII. by P.A. Barrett et al.

J. Chem. 63, p. 623, 1985. Metallophthalocyanine Dimers Incorporating Five–Aton Covalent Bridges by Leznoff et al.

Inorganic Chemistry, 1(2), pp. 334–336, 1962. Aluminum and Silicon Hydroxy and Oxy Systems of the Phthalocyanino Type by Owen et al.

*Primary Examiner*—Mukund J. Shah
*Assistant Examiner*—Pavanaram K. Sripada
*Attorney, Agent, or Firm*—J. Lanny Tucker

[57] ABSTRACT

A cyan pigment, bis(phthalocyanylalumino) tetraphenyldisiloxane is prepared in a single reaction mixture. A phthalonitrile is reacted at high temperature with an aluminum salt in the presence of an ammonia donor such as urea, in an inert, high boiling organic solvent. The resulting reaction product is cooled and without isolation, refluxed in an aqueous solution of a pyridine compound containing dichlorodiphenylsilane. The desired cyan pigment is then isolated.

18 Claims, No Drawings

SYNTHESIS OF BIS (PHTHALOCYANYLALUMINO) TETRAPHENYLDISILOXANES

FIELD OF THE INVENTION

This invention relates to a novel synthetic method for the preparation of certain bridged phthalocyanine compounds, and particularly bis(phthalocyanylalumino) tetraphenyldisiloxanes that are cyan pigments.

BACKGROUND OF THE INVENTION

Certain phthalocyanine pigments, such as phthalocyanylalumino compounds, have been found useful in electrostatographic or electrophotographic developers (that is, toners) and imaging processes, as described for example in U.S. Pat. No. 4,311,775 (Regan). They have also been found useful more recently as components of inkjet printing inks.

A number of synthetic methods for preparing phthalocyanine pigments are known, all of which generally involve reacting a phthalic acid derivative with aluminum chloride at high temperature. Several lengthy steps are required in the known methods, and the product of each step must be purified to remove the various reaction solvents and by-products before proceeding. Thus, the methods are tedious and costly.

For example, U.S. Pat. No. 2,647,127 (Brouillard) and U.S. Pat. No. 2,673,854 (Brouillard) describe methods for manufacture of metal phthalocyanines by reaction of polyvalent metals with aromatic o-dicarboxylic acids, esters or anhydrides in the presence of urea or other nitrogen donors. These methods are embodiments of what is known as the "urea process". These patents describe the inclusion of a sulfur-containing compound in the reaction medium to allegedly improve yield of the metal phthalocyanines.

Bridged phthalocyanines are known. The oxygen-bridged dimer of aluminum phthalocyanine was first described several decades ago, Barrett et al, *J.Chem.Soc.* 1936, 1719–1736. Moreover, Leznoff et al, *Can.J.Chem.* 1985, 63, 623–631 describe dimers that are bridged between the phthalocyanine rings rather than the metal atoms.

The synthesis of certain silicon-bridged phthalocyanines is described by Owen et al, *Inorg.Chem.*, 1962, 1, 334–336. Alkoxy-bridged metallophthalocyanine dimers and their synthesis are described in U.S. Pat. No. 5,456,998 (Burt et al). U.S. Pat. No. 4,311,775 (noted above) also describes a representative synthetic method in which bridged chloroaluminum phthalocyanines are prepared firstly by the reaction of a phthalic acid derivative with aluminum chloride in a high boiling organic solvent.

In some known methods the intermediate reaction product is hydrolyzed in concentrated sulfuric acid to form hydroxyaluminum phthalocyanine, which is then coupled with, for example, dichlorodiphenylsilane in aqueous pyridine to form the silicon-bridged cyan pigment. In addition to each chemical step in this procedure, the product at each step must be purified by repeatedly washing in and filtering from various solvents. Thus, the overall procedure is quite long. In addition, proper disposal of the concentrated sulfuric acid is necessary.

Besides being tedious, such known preparatory methods may generate a large amount of solid which sublimes into the various crevices of reaction equipment, causing a massive cleanup problem. The sublimed solid includes several undesirable ammonium by-products. The subliming solid also severely limits the size of the reaction. All of these considerations increase the cost of the product considerably.

Thus, there is a serious need for an improved synthetic method for the preparation of certain silicon-bridged phthalocyanine pigments.

SUMMARY OF THE INVENTION

The problems noted above have been overcome using a method for providing the cyan pigment bis (phthalocyanylalumino)tetraphenyldisiloxane $(PcAlOSiPh_2)_2$ O comprising the steps of:

A) reacting from about 3.8 to about 4.2 equivalents of a phthalonitrile, one equivalent of an aluminum salt in the presence of a catalytic amount of an ammonia donor, in an inert, high boiling solvent at a temperature above about 200° C. for a sufficient time to form a phthalocyanylalumino reaction product, B) upon cooling the reaction product formed in step A, and without isolation, refluxing the reaction product with an aqueous solution of a pyridine compound containing dichlorodiphenylsilane to form the cyan pigment $(PcAlOSiPh_2)_2$ O, the refluxing being carried out at a temperature below the boiling point of the pyridine compound, and C) isolating the cyan pigment.

The method of this invention provides several advantages. It can be carried out in a single reaction vessel without the need for isolation of intermediate reaction products, and purification steps, and thus equipment and time are used more efficiently. Concentrated sulfuric acid is not needed, and therefore a disposal problem is avoided. Importantly, the subliming ammonium by-products of known processes are avoided.

The method of this invention is useful to prepare the noted compounds that have various utilities. The compounds are useful as pigments in electrophotographic developers, paints, inks or any other material in which a cyan colorant is desired.

DETAILED DESCRIPTION OF THE INVENTION

The method of this invention can be carried out within a single reaction vessel, with no intermediate purification or isolation steps. Only the final product is isolated and purified for later use.

In general, the method firstly comprises a reaction of a phthalonitrile (generally from about 3.8 to about 4.2, and preferably about 4, equivalents) and an aluminum salt (one equivalent) in the presence of a catalytic amount of an ammonia donor.

The phthalonitrile can be unsubstituted, or substituted with up to four substituents selected from any of substituted or unsubstituted alkyl (having 1 to 30 carbon atoms), substituted or unsubstituted alkoxy (having 1 to 30 carbon atoms), substituted or unsubstituted aryl (having 6 to 10 carbon atoms in the aromatic ring), substituted or unsubstituted cycloalkyl (having 5 to 10 carbon atoms in the carbocyclic ring), substituted or unsubstituted heterocyclic groups (having 5 to 10 carbon, sulfur, oxygen or nitrogen atoms in the ring), substituted or unsubstituted aryloxy (having 6 to 10 carbon atoms in the aromatic ring), halo, nitro, and any combinations thereof. Substituents not useful are amino, hydroxy, and charged groups (such as sulfo and carboxy). Unsubstituted phthalonitrile is preferred in the practice of this invention.

Useful aluminum salts include, but are not limited to, aluminum chloride, aluminum sulfate, aluminum acetate or aluminum alkoxides (such as aluminum isopropoxide). Aluminum chloride is preferred.

Useful ammonia donors include, but are not limited to, urea, biuret, guanidylurea, dicyandiamide, cyanuric acid and other compounds readily apparent to one skilled in the art that will provide ammonia in such reactions. Urea is preferred. The amount of the ammonia donor can vary widely depending upon its catalytic activity, the particular reactants used and other reaction conditions. In general, the ammonia donor is present in an amount of from about 5 to about 25 mole %, and preferably from about 10 to about 15 mole %, based on the amount of aluminum salt present in the reaction mixture. Higher amounts of ammonia donor can be used, if desired. One skilled in the art can find the optimum amount to use because using too much ammonia donor will cause sublimation, and using too little will decrease product yields.

The reaction medium is a high boiling solvent (or mixture thereof). By "high boiling" is meant that the solvent must have a boiling point higher than the highest temperature at which the given reaction is carried out (at a given reaction pressure). In general, this means that the boiling point is above about 200° C., and preferably above about 210° C. (at atmospheric pressure), but higher boiling points may be desired if the reaction exhibits a high exotherm. Useful solvents include, but are not limited to, high boiling alcohols, aromatic hydrocarbons, and aromatic chlorinated hydrocarbons. Representative solvents include chlorinated naphthalenes, chlorinated benzenes (such as trichlorobenzene), biphenyl, DOWTHERM™ (Dow Chemical), quinoline, decanol and dodecanol. 1-Chloronaphthalene is preferred.

The reaction is carried out at a temperature above about 200° C., and preferably above about 210° C. A skilled artisan would be readily able to determine the optimum temperature for a given set of reactants, catalyst, solvent and desired reaction time with a few experiments in view of this teaching. The resulting phthalocyanylalumino intermediate reaction product is generally produced within about an hour, and preferably within from about 2 to about 4 hours. In a preferred embodiment, the intermediate reaction product can be produced within about 3–4 hours at from 220°–250° C.

The reaction mixture containing the intermediate reaction product is cooled over an appropriate time, and without isolation, the intermediate reaction product is refluxed with an aqueous solution of a pyridine compound containing dichlorodiphenylsilane. Useful pyridine compounds include pyridine and derivatives of pyridine such as various isomers of methylpyridine (picoline), quinoline, isoquinoline, lutidines and others readily apparent to one skilled in the art. Pyridine and methylpyridine are preferred, and pyridine is most preferred.

The refluxing temperature is generally dependent upon the pyridine compound chosen, and is thus below the boiling point of that compound.

The amounts of water and the pyridine compound added to the reaction mixture at this point can vary widely, but generally, the two solvents are added at an appropriate volume ratio, and the total volume added is generally at least about 50% of the volume of the final reaction mixture. Water is added to provide a stoichiometric excess in relation to the dichlorodiphenylsilane.

The dichlorodiphenylsilane is added to the reaction mixture with the two solvents in an amount of at least about 0.8 equivalent based on aluminum concentration. One equivalent is most preferred, but an excess can also be used.

The resulting mixture is refluxed generally at a suitable temperature below about 110° C. for at least 2 hours, and preferably for from about 3 to about 6 hours, to provide the desired cyan pigment.

The method of this invention is generally carried out at atmospheric pressure, but superatmospheric pressures may be needed to keep some solvents in liquid form during the reactions.

The resulting cyan pigments can be isolated using any suitable procedure known in the art. For example, a series of filtrations, centrifuging, washings, Soxhlet extractions or combination thereof can be used. A preferred isolation procedure is described in Example 1 below.

The following examples are provided to illustrate the practice of this invention, and is not meant to limit it in any way.

Materials and Methods for the Example

Unless otherwise indicated, the reactants and solvents used in the examples were obtained from various commercial sources (Eastman Kodak Co, Fluka Chemicals, Aldrich Chemicals or Baker Chemicals).

EXAMPLE 1

Preparation of Bis(phthalocyanylalumino) tetraphenyldisiloxane Cyan Pigment

Aluminum chloride (80.3 g, 0.602 mol) was added, under nitrogen, to a uniformly dispersed mixture of phthalonitrile (320 g, 2.5 mol) and urea (4.8 g, 0.080 mol) in 1-chloronaphthalene (1.1 liter) in a 5-liter, four-necked, round-bottomed flask equipped with mechanical stirring, an electric heating mantle, a water-cooled condenser, and a thermometer. The resulting mixture was heated to about 215° C., at which point an exothermic reaction began, causing the temperature to increase rapidly to 250° C. After three hours at 220°–250° C., heating was discontinued and the reaction mixture was left to cool.

When the reaction mixture temperature had dropped to about 125° C., the flask was charged with pyridine (1.36 liter), water (200 ml) and dichlorodiphenylsilane (136 ml, 0.647 mol). Heating was resumed and the reaction was continued at reflux (107° C.) for six hours. The resulting mixture was cooled overnight with stirring.

The contents of the flask were diluted at room temperature with methanol (4 liters) in a larger vessel, stirred for 30 minutes and suction filtered under vacuum through a 4-liter Buchner funnel having a medium porosity sintered glass frit. The resulting filter cake was washed with additional methanol four times (2 liters each time), then filtered to a damp solid. This damp cake was added to a solution of sodium hydroxide pellets (80 g) in water (2.5 liters), stirred for 75 minutes and filtered. The wet filter cake was washed three times with water (2.5 liters each time) until the pH of the filtrate was neutral. The damp cake was slurried in acetone (3.5 liters) for two hours, filtered, rinsed with acetone (1 liter), and filtered to dryness.

The yield of greenish-blue powder was 352 g (78%). Analysis confirmed the desired product. FDMS(DMSO): m/z 574(13%, PcAlCl), 745(49%, m/z 1490/2$^+$), 1490 (100%, M$^+$), 1525(18%, M$^+$+Cl). FTIR(KBr): 1514, 1471, 1426, 1334, 1289, 1165, 1121, 1080, 903, 758, 733, 712, 700, 520 cm$^{-1}$. Elemental analysis: Calculated for $C_{88}H_{52}Al_2N_{16}O_3Si_2$: C, 70.86; H, 3.51; N, 15.02: Al, 3.62; Cl 0.0; Si, 3.77. Found: C, 69.42; H, 3.99; N, 14.40; Al, 3.5; Cl, 0.93; Si, 3.8.

EXAMPLE 2
Preparation Using 4-Picoline

Example 1 was repeated except that 4-picoline (methylpyridine) was used in place of pyridine in the second reaction step.

The yield of greenish-blue powder was 391 g (86%). Analysis confirmed the desired product. FDMS(DMSO): m/z 539(100%, PcAl), 574(62%, PcAlCl), 746(50%, M$^+$/2), 874(69%, M$^+$-PcAl-Ph), 953(31%, M$^+$-PcAl), 1096 [25% (PcAl)$_2$O], 1490(47%, M$^+$). Elemental analysis: Found: C, 69.88; H, 3.73; N, 14.45; Al, 3.5; Cl, 0.95; Si, 4.1.

EXAMPLE 3
Preparation Using A Different Solvent

The procedure of Example 1 was generally followed using 1,2,4-trichlorobenzene in place of 1-chloronaphthalene as the solvent in the first reaction step. A mixture of aluminum chloride (20.3 g, 0.152 mol), phthalonitrile (80.0 g, 0.624 mol), urea (1.2 g, 0.02 mol), and 1,2,4-trichlorobenzene (275 ml) was refluxed for 3 hours at 217° C. The procedure of Example 1 was then followed exactly.

The yield of greenish-blue powder was 101 g (85%). Analysis revealed a mixture of the desired product and chlorinated analogs. FDMS(DMSO): m/z 574(91%, PcAlCl), 608 (100%, ClPcAlCl), 642(37%, Cl$_2$PcAlCl), 745(25%, M$^+$/2), 763(44%, m/z 1524/2$^+$), 780(54%, m/z 1558/2$^+$), 796(20%, m/z 1592/2$^+$), 1490(30%, M$^+$), 1524 (43%, M$^+$+Cl), 1558(43%, M$^+$+2Cl), 1592(17%, M$^+$+3Cl). Elemental analysis: Calculated for C$_{88}$H$_{52}$Al$_2$N$_{16}$O$_3$Si$_2$: C, 67.73; H, 3.23; N, 14.36; Al, 3.46; Cl 4.54; Si, 3.60. Found: C, 66.76; H. 3.47; N, 14.27; Al, 3.5; Cl, 4.6; Si, 3.5.

EXAMPLE 4
Preparation Using Aluminum Isopropoxide

A 3-liter flask in a heating mantle was equipped with a mechanical stirrer, thermometer and reflux condenser (with no water flow). The flask was charged with trichlorobenzene (720 ml), phthalonitrile (180 g, 1.4 mol), aluminum isopropoxide (69.6 g, 0.34 mol) and urea (124.8 g, 2.08 mol). While being stirred, diethylene glycol (48 ml, 54 g) was added to the reaction mix, which was then heated to 210° C. for 1.5 hours.

Heating was discontinued and the reaction mixture was cooled to 100° C. by running cool water through the condenser. Pyridine (780 ml) was added to the mixture, followed by distilled water (108 ml) and carefully, dichlorodiphenylsilane (90 g, 0.36 mol). Heating was resumed and the reaction was continued at reflux (104° C.) for five hours, then cooled to 60° C.

The contents of the flask were diluted with methanol (1 liter), and further cooled to 45° C. The mixture was filtered and the resulting filter cake was washed with methanol (300 ml). The damp cake was then slurried in 5% aqueous sodium hydroxide (800 ml) for 15 minutes, then filtered. It was washed again with 5% aqueous sodium hydroxide (200 ml), and then with water (300 ml). The damp filter cake was slurried in acetone (800 ml) for 15 minutes, then collected and allowed to dry in a funnel.

The yield of dark blue solid was 211.5 g (83%). Analysis confirmed the desired product. IR (Kbr): 3000–3030(w), 1500(m), 1420(m), 1330(s), 1280(m) 1110(s), 1060(s), 900 (m), 755(m), 730(s), 700(m), 520 cm$^{-1}$ (m).

The invention has been described in detail with particular reference to preferred embodiments thereof, but it will be understood that variations and modifications can be effected within the spirit and scope of the invention.

We claim:

1. A method for providing the cyan pigment bis (phthalocyanylalumino)tetraphenyldisiloxane (PcAlOSiPh$_2$)$_2$O comprising the steps of:

A) reacting from about 3.8 to about 4.2 equivalents of a phthalonitrile, one equivalent of an aluminum salt in the presence of a catalytic amount of an ammonia donor, in an inert, high boiling solvent at a temperature above about 200° C. for a sufficient time to form a phthalocyanylalumino reaction product, B) upon cooling said reaction product formed in step A and without isolation, refluxing said reaction product with an aqueous solution of a pyridine compound containing dichlorodiphenylsilane to form the cyan pigment (PcAlOSiPh$_2$)$_2$O, said refluxing being at a temperature below the boiling point of said pyridine compound, and C) isolating said cyan pigment.

2. The method of claim 1 wherein about 4 equivalents of a phthalonitrile are used in step A.

3. The method of claim 1 wherein said aluminum salt is aluminum chloride, aluminum sulfate, aluminum acetate, or an aluminum alkoxide.

4. The method of claim 3 wherein said aluminum salt is aluminum chloride or aluminum isopropoxide.

5. The method of claim 1 wherein said ammonia donor is urea, biuret, guanidylurea, dicyandiamide or cyanuric acid.

6. The method of claim 5 wherein said ammonia donor is urea.

7. The method of claim 1 wherein said high boiling solvent is an aromatic hydrocarbon, an aromatic chlorinated hydrocarbon or a high boiling alcohol.

8. The method of claim 7 wherein said high boiling solvent is a 1-chloronaphthalene.

9. The method of claim 1 wherein step A is carried out at a temperature about 210° C.

10. The method of claim 9 wherein step A is carried out for at least about one hour.

11. The method of claim 1 wherein said ammonia donor is present in an amount of from about 5 to about 25 mole % based on the concentration of said aluminum salt.

12. The method of claim 1 wherein said pyridine compound is pyridine.

13. The method of claim 1 wherein step B is carried out for at least about 2 hours.

14. The method of claim 1 wherein step B is carried out at a temperature below about 110° C.

15. The method of claim 1 wherein dichlorodiphenylsilane is present in step B in an amount of at least about 0.8 equivalent based on aluminum concentration.

16. A method for providing the cyan pigment bis (phthalocyanylalumino)tetraphenyldisiloxane (PcAlOSiPh$_2$)$_2$O comprising the steps of:

A) reacting about 4 equivalents of phthalonitrile, one equivalent of aluminum chloride in the presence of a catalytic amount of urea, in 1-chloronaphthalene at a temperature of at least about 210° C. for up to 3 hours to form chloroaluminum phthalocyanine reaction product, B) upon cooling said reaction product formed in step A to a temperature of from about 110° to about 130° C. and without isolation, refluxing said reaction product with an aqueous solution of pyridine containing from about 0.8 to about 1 equivalent of dichlorodiphenylsilane to form the cyan pigment (PcAlOSiPh$_2$ )$_2$O, and C) isolating said cyan pigment.

17. The method of claim 1 wherein said high boiling solvent is an aromatic chlorinated hydrocarbon.

18. The method of claim 17 wherein said high boiling solvent is a chlorinated naphthalene or chlorinated benzene.

* * * * *